Dec. 15, 1931. E. SILVESTRI 1,836,623
DISMOUNTABLE SLEIGH MOUNTED UPON SKIS
Filed Sept. 14, 1929
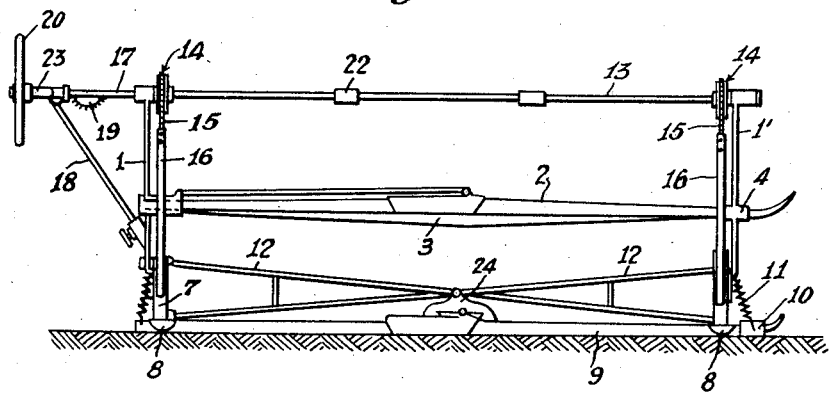
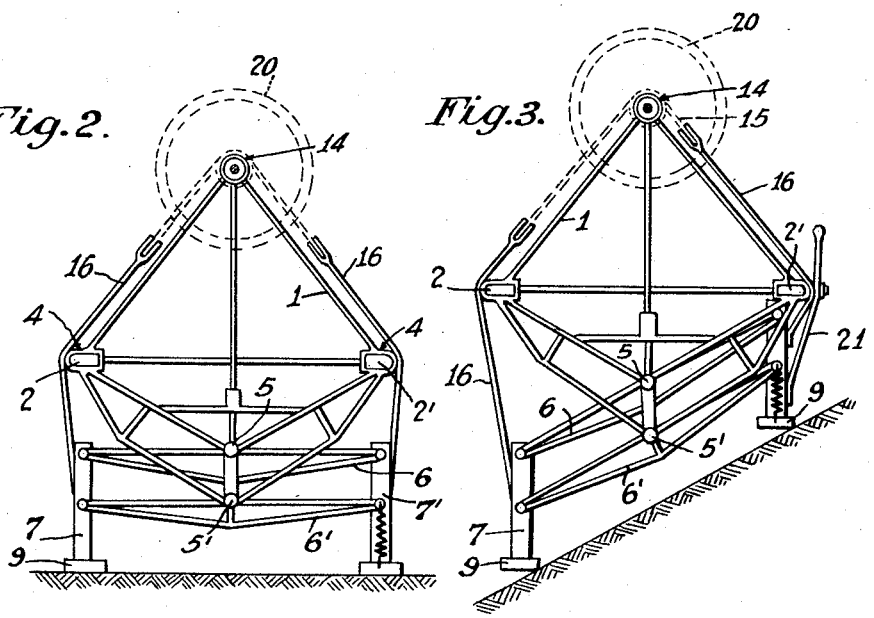
Inventor:
Enrico Silvestri
By Knight Bros.
attys.

Patented Dec. 15, 1931

1,836,623

UNITED STATES PATENT OFFICE

ENRICO SILVESTRI, OF MILAN, ITALY

DISMOUNTABLE SLEIGH MOUNTED UPON SKIS

Application filed September 14, 1929, Serial No. 392,653, and in Italy September 17, 1928.

This invention relates to dismountable sleighs mounted upon skis, and has for its main object to provide a sleigh, wherein the bearing portion is connected to the skis bearing upon the ground in such a manner that it is maintained in horizontal position without regard to the relative position of the supporting skis. This sleigh has also other features which regard the structure of its ends and the connection thereof with the skis, in order to easily permit the dismounting of the sleigh into its components which may be easily transported.

The annexed drawings show diagrammatically an example of the sleigh in accordance with the invention, wherein:

Fig. 1 is a side elevation of the complete sleigh.

Fig. 2 is an end view when the two bearing skis are at the same level, and

Fig. 3 is a similar end view where the skis are bearing on different levels.

As will be seen from these figures, the complete sleigh comprises two ends or heads, either of which is formed with a rigid frame 1, for instance, of steel tubes of polygonal contour, having two opposed vertices on the vertical and the other two opposed vertices on the horizontal line. To the side vertices are suitably fixed the extreme portions of two skis 2, 2' forming the longitudinal attachments for the bearing cloth 3 of the sleigh. The connection of the skis 2, 2' to the frames 1, 1' may be suitably accomplished by means of boxes 4 on the frames 1, 1' wherein the corresponding portions of the skis are lodged.

Opposite to the lower portion of each frame 1, 1' where its rods form two vertically superposed knots or joints 5, 5' are inserted two cross bars 6, 6' which are also formed by network members and have almost the same width of the frame 1. The cross-bars 6, 6' are maintained parallel with each other by means of legs 7, 7', the ends of which are linked in such a manner as to remain substantially in a vertical position, said rods extending below the under cross bar 6' and terminating into seats or shoes 8 for fastening the bearing skis.

The attachment of the skis on the legs 7, 7', and in general on the two frames formed by the two couples of extreme cross bars 6, 6', may be obtained in various ways. In the example shown, the ends of the skis 9, 9' are embraced by girders 10, each of which is connected by means of a strong spring to one of the legs 7, 7', thus maintaining the skis pushed against the seats 8 and therefore well connected to the movable frames, although allowing of relative displacements.

Moreover in the example shown, the skis 9, 9' bear a middle hoop which is connected by tie-rods 12 to deformable frames constituted by the cross-bars 6, 6' and the legs 7, 7'; but of course the connection of the bearing skis with the deformable frame may be effected in any other suitable way.

The upper vertex of each rigid frame 1 and 1' is formed with a bearing, and within said bearings is mounted a rotatable shaft 13, adapted to be separated into two or more members and having toothed chain wheels 14 adjacent to both ends. These wheels 14 engage with chain portions 15 each being attached either directly or by means of tie-rods 16, 16' to the legs 7, 7' of the same deformable frame.

To one end of the shaft 13 is connected a rotatable shaft 17, properly supported by element 18, bearing a hand wheel 20, the rotation of which permits the rotation of the shaft 13 in both directions, thus raising one of legs 7, 7' and lowering correspondingly the other one.

In this manner it will be possible to cause the deformable frames 6, 7 to take simultaneously any required position, thus accommodating the relative level of the skis 9, 9' to the transverse slope of the ground so that the bearing plane of the sleigh (cloth 3) is maintained horizontal.

This possibility avoids the necessity of laterally sustaining the sleigh to prevent the same to descend on the slope, and eliminates and danger of capsizing. To fix the sleigh in the position adapted to the transverse slope of the ground to be travelled over, upon one or both sides of the heads, connecting members between the rigid frames 1, 1' and the deformable frames 6, 7 may be provided as shown, only by way of example by the rod 21 at the right hand on Fig. 3.

By this means it will be obviated that frames 6, 7 leave spontaneously the position given to them by the hand-wheel 20.

For the same purpose an irreversible drive may be inserted between the hand-wheel 20 and the shaft 13 or the wheels 14 for the purpose of permitting the transmission of movement from the hand-wheel 20 to the chains 15, but preventing a pull on the chains to cause the handwheel 20 to be rotated.

The controlling and fastening device for the inclination of the sleigh which is constituted by the shaft 13, the hand-wheel 20, the chain-wheel 14, and chain 15, mounted on the upper portion of the frame 1, may also be replaced by an irreversible drive applied, for instance, on the pivot 5 or 5', or in one of the pivots of the linked cross-bar system 6—6' or upon two thereof.

For dismounting the sleigh into members of small size, the shaft 13 is constituted of members which are joined together, for instance, by means of sleeves 22 and the hand-wheel 20 is pivoted on 23 to the sleeve bearing the same in order to be carried into the plane of the corresponding head after the portion of shaft 19 has been tilted thereon. Also the tie-rods 12 are rendered pliable to reduce them to a small volume, after having been detached from the heads and skis.

In the example shown the skis are pliable and these bearing 9, 9' are provided with a middle gripper for attachment of the tie-rods 12. However, the skis may be of any suitable kind and the gripper 24 could be exchanged for any other attachment permanently fixed to the ski or susceptible of being mounted thereon when required.

The described sleigh satisfies all requirements for any kind of loads upon snow, even under hard conditions, and allows at the same time a quick and easy mounting or dismounting; and when dismounted, it is reduced to easily transportable parts.

Having now particularly described and ascertained the nature of my said invention and in what manner the same is to be performed, I declare that what I claim is:—

1. In combination with a portable sleigh, an assembly comprising two end frames, and a horizontal supporting surface fixed therebetween, a pair of skis supporting said end frames, and means for bearing said assembly in said horizontal position on said skis, said means being adapted to permit relative elevational movement of said skis.

2. A portable sleigh as claimed in claim 1, wherein the horizontal supporting surface is disposed upon skis supported in the end frames.

3. In combination with a portable sleigh, two end frames, a horizontal supporting surface fixed therebetween, a cross-bar system pivoted to the lower end of each end frame, supporting legs pivoted to said cross-bar systems at each extremity thereof, and bearing skis attached to said supporting legs.

4. A portable sleigh as claimed in claim 3, wherein the attachment of the bearing skis and the supporting legs is detachable and yieldable.

5. In combination with a portable sleigh, two end frames, a horizontal supporting surface fixed therebetween, a shaft extending longitudinally of said sleigh between the upper portions of said end frames, a cross-bar system pivoted to the lower portion of each end frame, supported legs pivoted to said cross-bar systems at each extremity thereof, bearing skis attached to said supporting legs, and means for adjusting the relative elevation of said skis.

6. A portable sleigh as claimed in claim 5, with further means for fixing the skis in their adjusted elevated position.

7. A portable sleigh as claimed in claim 5, with sprocket wheels mounted upon said shaft adjacent each end frame, means for rotating said shaft, and flexible chains each cooperating with one of said wheels and the extremities of which are attached to the legs adjacent the corresponding end frame.

8. A portable sleigh as claimed in claim 5, with sprocket wheels mounted upon said shaft adjacent each end frame, means for rotating said shaft, and flexible chains each cooperating with one of said wheels and the extremities of which are attached to the legs adjacent the corresponding end frame, wherein the several elements are fixed in a detachably articulated manner, thereby allowing easy dismounting and convenient assembly for transportation purposes.

9. A portable sleigh as claimed in claim 5, with sprocket wheels mounted upon said shaft adjacent each end frame, flexible chains, each cooperating with one of said wheels, the extremities of which are attached to the legs adjacent the corresponding end frame, a hand wheel mounted upon an extremity of said shaft, and means for rotating said shaft under control of the hand wheel and preventing rotation of said shaft under control of the flexible chains.

Signed at Milan (Italy), this 6th day of September, 1929.

ENRICO SILVESTRI.